2,791,576

PROCESS OF POLYMERIZING OLEFINS WITH GROUP 6A OXIDE

Edmund Field, Chicago, and Morris Feller, Park Forest, Ill., assignors to Standard Oil Company, Chicago, Ill., a corporation of Indiana No Drawing. Application January 12, 1956, Serial No. 558,616

9 Claims. (Cl. 260—94.9)

This invention relates to a novel polymerization process. In a more specific aspect, this invention relates to a novel process for the polymerization of ethylene, propylene or their mixtures by contact with a catalytic mixture prepared by admixing an alkaline earth metal aluminum hydride having the general formula $M(AlH_4)_2$, wherein M represents an alkaline earth metal, with a solid catalytic material containing an oxide of a metal of group 6a (left hand sub-group of group 6) of the Mendeleef periodic table, viz, one or more of the oxides of Cr, Mo, W or U.

One object of our invention is to provide novel and highly useful catalysts for the preparation of high molecular weight polymers from ethylene-containing gas mixtures. Another object is to provide a process of ethylene and/or propylene polymerization in which the yields of solid polymer are greatly increased, as compared with the yields heretofore obtainable solely by the use of sub-hexavalent molybdena catalysts and similar catalysts. Another object is to provide a novel process for the polymerization of ethylene and/or propylene to high molecular weight, normally solid polymers. Still another object of our invention is to provide a novel process for the conversion of gas mixtures comprising essentially ethylene or propylene to high molecular weight, solid resinous or plastic materials.

A further object is to provide a relatively low temperature, low pressure process for the conversion of ethylene-containing gases to high molecular weight resinous or plastic materials. An additional object of the present invention is to provide a process for the copolymerization of ethylene with other polymerizable materials to provide novel resinous materials. Yet another object of our invention is to provide a process for the preparation of solid, elastic polymers from propylene. These and other objects of our invention will become apparent from the ensuing description thereof.

Briefly, the inventive process comprises the conversion of ethylene, propylene or their mixtures principally to high molecular weight, normally solid, resinous polymers by contact with a catalytic material prepared from a group 6a metal oxide, preferably supported on a difficultly reducible metal oxide, and a metal hydride having the formula $M(AlH_4)_2$, wherein M represents an alkaline earth metal. The inventive process is effected at temperatures between about 130° C. and about 325° C., preferably between about 180° C. and 260° C., and pressures between about atmospheric and 15,000 p. s. i. g. or higher, preferably between about 200 and 5000, or about 1000 p. s. i. g. The normally solid materials produced by the catalytic conversion tend to accumulate upon and within the solid catalyst. It is desirable to supply to the reaction zone a liquid medium which serves both as a reaction medium and a solvent for the solid reaction products. Suitable liquid reaction media for polymerization include various hydrocarbons, particularly an aromatic hydrocarbon such as benzene, toluene or xylenes. For the polymerization of propylene, less readily alkylatable reaction media such as cycloparaffins, e. g., cyclohexane or decaline, or paraffins, e. g., isooctane, are preferred. The conversion of ethylene or propylene can be effected in the absence of a liquid reaction medium or solvent and the catalyst containing accumulated solid polymeric conversion products can be treated from time to time, within or outside the conversion zone, to effect removal of conversion products therefrom and, if necessary, reactivation or regeneration of the catalyst for further use.

The practice of the process of the present invention leads to polymers of widely variant molecular weight ranges and attendant physical and mechanical properties, dependent upon the selection of operating conditions. The inventive process is characterized by extreme flexibility both as regards operating conditions and as regards the products producible thereby. Thus the present process can be effected over extremely broad ranges of temperature and pressure. The practice of the present process can lead to grease-like ethylene homopolymers having an approximate molecular weight range of 300 to 700, wax-like ethylene homopolymers having an approximate specific viscosity $(\times 10^5)$ between about 1000 and 10,000, and tough, resinous ethylene homopolymers having an approximate specific viscosity $(\times 10^5)$ of 10,000 to more than 300,000 $[(\eta \text{ relative} -1) \times 10^5]$. By the term "tough, resinous polyethylene" as used in the present specification and claims, we mean polymer having a brittle point below —50° C. (A. S. T. M. Method D746-51T), impact strength greater than two foot pounds per inch of notch (A. S. T. M. Method D256-47T—Izod machine) and minimum elongation at room temperature (25° C.) of 100%.

The process of the present invention can be employed to effect the copolymerization of ethylene with other polymerizable materials, e. g. propylene. The molar ratio of ethylene to propylene may be between about 0.1 and about 10. Propylene alone may be polymerized, by the employment of the catalysts of the present invention, to normally solid polymers, in addition to oils and grease-like solids. Other polymerizable materials include mono-olefinic hydrocarbons such as n-butylenes, isobutylene, t-butylethylene, and the like, usually in proportions between about 1 and about 25 percent by volume, based on the volume of ethylene.

An important feature of the present invention is the employment of a catalyst prepared from molybdena-containing catalyst and a complex metal hydride having the formula $M(AlH_4)_2$, wherein M represents an alkaline earth metal, viz, beryllium, magnesium, calcium, strontium or barium. We may also employ mixtures of said metal hydrides. The employment of said metal hydride has numerous important practical consequences, as compared to processes wherein said metal oxide catalysts are employed alone. Thus, in the presence of a catalyst prepared from $M(AlH_4)_2$ and a group 6a metal oxide, high yields of solid polymers can be obtained from ethylene, the metal oxide-containing catalyst functions well in the presence of large proportions of liquid reaction medium, the metal oxide-containing catalyst retains strong polymerization activity for a long period of time (long catalyst life), polymers having desirable ranges of physical and chemical properties can be readily produced by controlling the reaction variables, etc., as will appear from the detailed description and operating examples which follow.

The alkaline earth metal aluminum hydrides can be prepared by known methods which do not, per se, constitute part of the present invention. Thus they may be prepared by metathetical reactions of alkaline earth metal halides, especially bromides, with highly reactive metal aluminum hydrides, for example, the alkali metal aluminum hydrides such as lithium aluminum hydride. These metathetical reactions are effected in a suitable solvent such as diethyl ether, although it may be possible in some cases to use solvents such as dioxane, tetrahydrofuran, etc. The selected solvent is essentially inert under the reaction conditions and functions as a solvent for the alkali metal aluminum hydride and alkaline earth metal aluminum hydride but, at most, as a solvent for part only of the co-product alkali metal halide which is formed in the reaction.

The function or functions of the metal hydride in our process are not understood. The metal hydrides alone are not catalysts for the polymerization of ethylene or propylene to yield high molecular weight, normally solid polymers under the conditions described herein. Yet, the metal hydrides promote the action of the group 6a metal oxide catalysts to increase the productivity (polymer yield) of said catalysts, sometimes prodigiously. It might be assumed that the complex metal hydrides function merely to react with catalyst poisons which might be present in small proportions of the order of a few parts per million in ethylene, propylene and/or in the liquid reaction medium; we have found, however, that even extremely pure ethylene or propylene and liquid reaction medium which have been contacted with alkali metal or said metal hydrides under reaction conditions and directly thereafter contacted in a separate zone with a molybdenum oxide catalyst, do not produce solid polymer in the high yields or quality which can be attained by the process of the present invention.

Ethylene and/or propylene can be converted to normally solid polymers by contacting it with the claimed catalysts without the necessity of a deliberate pre-reduction step, which is essential when group 6a metal oxides are employed as the sole catalysts. Prior to our invention, subhexavalent molybdenum oxides were known to be catalysts for the polymerization of ethylene to form normally-solid polymers only when supported upon the three difficultly reducible metal oxides: gamma-alumina, titania, zirconia. In the presence of the claimed metal hydrides, the group 6a metal oxide catalysts can be employed not only on alumina, titania or zirconia, but also on other supports for the polymerization of ethylene and/or propylene to form normally solid polymers, e. g., silica supports such as silica gel, kieselguhr, diatomite; silica-alumina, aluminosilicates, such as various clays and bleaching earths; and even adsorptive carbon, which is however not preferred. In a parctical process, it is preferable to furnish a difficultly reducible metal oxide support for the group 6a metal oxide catalyst, e. g. gamma-alumina.

The proportion of alkaline earth metal aluminum hydride which is employed can be varied from about 0.001 to about 2 parts by weight per part by weight of group 6a metal oxide catalyst (total weight of solid catalyst), usually between about .05 and about .5 part by weight. The optimum proportions can readily be determined in specific instances, by simple small-scale tests with the specific feed stocks, liquid reaction medium, reaction medium:catalyst ratio, catalyst, temperature, pressure and nature of the product which is desired.

The relative proportions of difficultly reducible metal oxide support to the catalytic metal oxide is not critical and may be varied throughout a relatively wide range such that such component is present in amounts of at least approximately 1 weight percent. The usual metal oxide support ratios are in the range of about 1:20 to 1:1, or approximately 1:10. We may employ conditioned alumina-metal oxide catalysts composed of gamma-alumina base containing about 1 to 80%, preferably about 5 to 35%, or approximately 10%, of catalytic metal oxide supported thereon.

Gamma-alumina, titania and zirconia supports for our catalysts may be prepared in any known manner and the oxides of molybdenum or other group 6a metal may likewise be incorporated in, or deposited on, the base in any known manner, e. g. as described in U. S. Patent 2,692,257 of Alex Zletz and U. S. Patent 2,692,258 of Alan K. Roebuck and Alex Zletz, both granted on October 19, 1954. Excellent results are obtained with metal oxide catalysts of the type conventionally employed for effecting commercial hydroforming, the word "hydroforming" being employed to mean processes of the type described in U. S. Letters Patents 2,320,147, 2,388,536, 2,357,332, etc.

The molybdena or other molybdenum-oxygen compounds, such as cobalt molybdate, may be incorporated in the catalyst base in any known manner, e. g. by impregnation, coprecipitation, co-gelling, and/or absorption, and the catalyst base and/or finished catalyst may be heat stabilized in the known manners heretofore employed in the preparation of hydroforming or hydrofining catalysts. Cobalt molybdate catalysts may be prepared as described in U. S. 2,393,288, 2,486,361, etc. Cobalt, calcium, nickel and copper salts of chromic, tungstic and uranic acids may also be employed, with or without a support.

The catalyst may be stabilized with silica (U. S. 2,437,532–3) or with aluminum ortho-phosphate (U. S. 2,440,236 and 2,441,297) or other known stabilizers or modifiers. The catalyst may contain calcium oxide (U. S. 2,422,172 and 2,447,043) or the base may be in the form of a zinc aluminate spinel (U. S. 2,447,016) and it may contain appreciable amounts of zirconia or titania (U. S. 2,437,531–2). Oxides of other metals such as magnesium, nickel, zinc, chromium, vanadium, thorium, iron, etc., may be present in minor amounts, below 10 weight percent of the total catalyst.

Although, as stated above, no reducing treatment need be effected on $MoO_3$ catalysts when they are employed in the presence of alkaline earth metal aluminum hydrides, a reducing or conditioning treatment is preferred in commercial processing. The conditioning or reducing treatment of the heaxvalent group 6a metal trioxide is preferably effected with hydrogen although other reducing agents such as carbon monoxide, mixtures of hydrogen and carbon monoxide (water gas, synthesis gas, etc.), sulfur dioxide, hydrogen sulfide, dehydrogenatable hydrocarbons, etc., may be employed. Hydrogen can be employed as a reducing agent at temperatures between about 350° C. and about 850° C., although it is more often employed at temperatures within the range of 450° C. to 650° C. The hydrogen partial pressures in the reduction or conditioning operation may be varied from subatmospheric pressures, for example even 0.1 pound (absolute) to relatively high pressures up to 3000 p. s. i. g., or even more. The simplest reducing operation may be effected with hydrogen simply at about atmospheric pressure.

Lithium aluminum hydride, an exceptionally active reducing agent, conditions and activates catalysts containing hexavalent group 6a metal oxides even at temperatures as low as 35° C., although in general temperatures between about 100° C. and about 300° C. can be employed. In practice, for example, a catalyst containing free or chemically combined group 6a metal trioxide is treated with a suspension of $LiAlH_4$ in a liquid hydrocarbon solvent at weight ratios of about 0.01 to about 1 $LiAlH_4$ per weight of solid catalyst. Sodium hydride (or sodium plus $H_2$) is effective in reducing and conditioning hexavalent group 6a catalysts such as $MoO_3$ at temperatures above about 180° C. and can be employed in the same proportions as $LiAlH_4$.

The partial reduction of the molybdena or other group 6a metal trioxide is carried out to the extent that the average valence state of the catalytic metal in the catalyst lies within the range of about 5.5 to about 2.0, preferably between about 3 and about 5.0.

The conditioning treatment hereinabove described is desirable not only for fresh catalyst, but also for catalyst which has become relatively inactive in the polymerization step. As will be hereinafter described, the polymer formed in the polymerization reaction must be continuously or intermittently removed from the catalyst particles, preferably by means of solvents, and it is usually necessary or desirable to condition a catalyst surface which has been thus freed to some extent from polymer before it is again employed for effecting polymerization. When catalyst can no longer be rendered sufficiently active by simple removal of polymer and conditioning with a reducing gas as hereinabove described, it may be regenerated by extraction with water, ammonium salt solutions, or dilute aqueous acids, thereafter burning combustible deposits therefrom with oxygen followed by the conditioning step. Detoxification of the catalysts by treatment with dilute aqueous solutions of per-acids such as permolybdic, pervanadic or pertungstic acids may be practiced, followed by hydrogen-conditioning of the catalysts.

The catalysts can be employed in various forms and sizes, e. g., as powder, granules, microspheres, broken filter cake, lumps, or shaped pellets. A convenient form in which the catalysts may be employed is as granules of about 20–100 mesh/inch size range.

The ethylene charging stocks used in our process may contain hydrogen and hydrocarbons, as in refinery gas streams, for example, methane, ethane, propane, etc. However, it is preferred to employ as pure and concentrated ethylene charging stocks as it is possible to obtain. When the charging stock contains propylene as well as ethylene, both these olefins may contribute to the production of resinous high molecular weight products. Propylene charging stocks for our process may be free of other olefins but diluted with propane or other close-boiling alkanes.

It is desirable to minimize or avoid the introduction of oxygen, carbon dioxide, water or sulfur compounds into contact with the catalyst.

In general, polymerization can be effected in the present process at temperatures between about 130 and about 325° C. Increasing the polymerization temperature tends to reduce the average molecular weight and density of the polymers produced by the process. Usually polymerization is effected in the present process at temperatures between about 180° C. and about 260° C. or the preferred narrower range of about 230° C. to about 250° C. The conjoint use of polymerization temperatures between about 230° C. and about 250° C. and a liquid hydrocarbon reaction medium such as benzene, xylenes, decalin, or methyl decalins is highly desirable in producing polymers having specific viscosities ($\times 10^5$) ranging on the average from about 10,000 to about 30,000 in continuous operations with relatively long on-stream periods and clean catalysts.

The present process can be employed for the production of relatively high molecular weight ethylene or propylene hetero- and homo-polymers at relatively low pressures. The process of the present invention can be effected to some extent even at atmospheric pressure. The upper limit of polymerization pressure is dictated by economic considerations and equipment limitations and may be 10,000 p. s. i. g., 20,000 p. s. i. g., or even more. A generally useful and economically desirable polymerization pressure range is between about 200 and about 5000 p. s. i. g., preferably between about 500 and about 1500 p. s. i. g., e. g., about 1000 p. s. i. g.

The contact time or space velocity employed in the polymerization process will be selected with reference to the other process variables, catalysts, the specific type of product desired and the extent of olefin conversion desired in any given run or pass over the catalyst. In general, this variable is readily adjustable to obtain the desired results. In operations in which the olefin charging stock is caused to flow continuously into and out of contact with the solid catalyst, suitable liquid hourly space velocities are usually selected between about 0.1 and about 10 volumes, preferably about 0.5 to 5 or about 2 volumes of olefin solution in a liquid reaction medium, which is usually an aromatic hydrocarbon such as benzene, xylenes or tetralin, or a cycloaliphatic hydrocarbon such as decalin (decahydronaphthalene). The amount of ethylene or propylene in such solutions may be in the range of about 2 to 50% by weight, preferably about 2 to about 10 weight percent or, for example, about 5 to 10 weight percent. When the ethylene concentration in the liquid reaction medium is decreased below about 2 weight percent, the molecular weight and melt viscosity of the polymeric products drop sharply. The rate of olefin polymerization tends to increase with increasing concentration of the olefin in the liquid reaction medium. However, the rate of olefin polymerization to form high molecular weight, normally solid polymers is preferably not such as to yield said solid polymers in quantities which substantially exceed the solubility thereof in said liquid reaction medium under the reaction conditions, usually up to about 5–7 weight percent, exclusive of the amounts of polymeric products which are selectively adsorbed by the catalyst. Although olefin concentrations above 10 weight percent in the liquid reaction medium may be used, the resultant solutions of polymer in the reaction medium become very viscous and difficult to handle and severe cracking or spalling of the solid metal oxide catalyst particles or fragments may occur, resulting in catalyst carry-over as fines with the solution of polymerization products and extensive loss of catalyst from the reactor.

In batch operations, operating periods of between one-half and about 10 hours, usually between about 1 and about 4 hours, are employed and the reaction autoclave is charged with olefin as the pressure falls as a result of the olefin conversion reaction.

The solvent:catalyst weight ratio can be varied in the range of about 5 to about 3000, or even higher for flow systems. The employment of high solvent:catalyst ratios, which is rendered possible by the presence of an alkaline earth metal aluminum hydride in the reaction zone, is very important in obtaining high yields of polymer.

The olefin charging stocks can be polymerized in the gas phase and in the absence of a liquid reaction medium by contact with catalysts produced by admixing an alkaline earth metal aluminum hydride and molybdena or other group 6a catalysts. Upon completion of the desired polymerization reaction it is then possible to treat the solid catalyst for the recovery of the solid polymerization products, for example by extraction with suitable solvents. However, in the interests of obtaining increased rates of olefin conversion and of continuously removing solid conversion products from the catalyst, it is desirable to effect the conversion of the olefin in the presence of suitable liquid reaction media. The liquid reaction medium may also be employed as a means of contacting the olefin with catalyst by preparing a solution of the olefin feed stock in the liquid reaction medium and contacting the resultant solution with the polymerization catalyst.

The liquid reaction medium functions as a solvent for the olefin to bring the olefin into the necessary contact with the catalyst surface and/or growing olefin polymer chain. The medium dissolves some of the normally solid product from the catalyst surface.

Various classes of individual hydrocarbons or their mixtures which are liquid and substantially inert under the polymerization reaction conditions of the present process can be employed. Members of the aromatic hydrocarbon series, particularly the mononuclear aromatic hydrocarbon, viz, benzene, toluene, xylenes, mesitylene and xylene-p-cymene mixtures can be employed. Tetrahydronaphthalene can also be employed. In addition, we may employ such aromatic hydrocarbons as ethylbenzene, isopropylbenzene, n-propylbenzene, sec-butylbenzene, t-butylbenzene, ethyltoluenes, ethylxylenes, hemimellitene, pseudocumene, prehnitene, isodurene, diethylbenzenes, isoamylbenzene and the like. Suitable aromatic hydrocarbon fractions can be obtained by the selective extraction of aromatic naphthas, from hydroforming operations as distillates or bottoms, from cycle stock fractions of cracking operations, etc.

We may also employ certain alkyl naphthalenes which are liquid under the polymerization reaction conditions, for example, 1-methylnapthalene, 2-isopropylnaphthalene, 1-n-amylnaphthalene and the like, or commercially produced fractions containing these hydrocarbons.

Certain classes of aliphatic hydrocarbons can also be employed as a liquid hydrocarbon reaction medium in the present process. Thus, we may employ various saturated hydrocarbons (alkanes and cycloalkanes) which are liquid under the polymerization reaction conditions and which do not crack substantially under the reaction conditions. Either pure alkanes or cycloalkanes or commercially available mixtures, freed of catalyst poisons, may be employed. For example, we may employ straight run naphthas or kerosenes containing alkanes and cycloalkanes. Specifically, we may employ liquid or liquefied alkanes such as n-pentane, n-hexane, 2,3-dimethylbutane, n-octane, iso-octane (2,2,4-trimethylpentane), n-decane, n-dodecane, cyclohexane, methylcyclohexane, dimethylcyclopentane, ethylcyclohexane, decalin, methyldecalins, dimethyldecalins and the like.

We may also employ a liquid hydrocarbon reaction medium comprising liquid olefins, e. g., n-hexenes, cyclohexene, octenes, hexadecenes and the like.

The normally solid polymerization products which are retained on the catalyst surface or grease-like ethylene polymers may themselves function to some extent as a liquefied hydrocarbon reaction medium, but it is highly desirable to add a viscosity reducing hydrocarbon, such as those mentioned above, thereto in the reaction zone.

The liquid hydrocarbon reaction medium should be freed of poisons by acid treatment, e. g., with anhydrous p-toluenesulfonic acid, sulfuric acid, phosphoric acid or by equivalent treatments, for example with aluminum halides, or other Friedel-Crafts catalysts, maleic anhydride, calcium, calcium hydride, sodium or other alkali metals, alkali metal hydrides, lithium aluminum hydride, hydrogen and hydrogenation catalysts (hydrofining), filtration through a column of copper grains or 8th group metal, etc., or by combinations of such treatments.

Large scale polymerization operations can be carried out with the equipment and processing arrangements described in our copending application for United States Letters Patent Serial No. 324,608.

The following are illustrative examples only, which are not intended to define or limit the otherwise broad scope of the present invention.

*Example 1*

Magnesium aluminum hydride was prepared by the reaction of magnesium bromide, in turn prepared from magnesium and bromine, with lithium aluminum hydride in anhydrous diethyl ether (method of E. Wiberg and R. Bauer, Z. Naturforsch 5b, 397 (1950)). The lithium bromide co-product of this reaction is only partially soluble in the ether and some of it precipitates therefrom during the reaction. The lithium bromide precipitate is separated by filtration. Ether is evaporated from the filtrate by means of a dry nitrogen stream, followed by evacuation at temperatures up to 100° C. The resultant magnesium aluminum hydride preparation contains about 50% of the co-product, lithium bromide, which does not, however, prevent the magnesium aluminum hydride from functioning as a promoter or co-catalyst with group 6a metal oxides in processes for the polymerization of olefins.

A 250 ml. capacity stainless steel Magne-Dash autoclave provided with a magnetically-actuated, stirrup-type stirrer was charged with 100 cc. of purified toluene under a blanket of nitrogen. The toluene had been dehydrated and decarbonated by refluxing with lithium aluminum hydride and 8 weight percent $MoO_3$-activated alumina catalyst for 16 hours at atmospheric pressure followed by distillation under nitrogen and storage over sodium. The reactor was also charged with 1 g. of a catalyst prepared by partial reduction of 8 weight percent $MoO_3$ supported on gamma-alumina with hydrogen at 480° C. and atmospheric pressure for about 16 hours. To the reactor was then added 0.52 g. of the $Mg(AlH_4)_2$ (containing LiBr). The reactor was then flushed with nitrogen and heated with stirring to 230° C. and dehydrated and decarbonated ethylene was then introduced to an initial pressure of 1160 p. s. i. g. Reaction was continued with stirring for about 20 hours, ethylene being repressured into the reactor from time to time. After the reaction period, the reactor was allowed to cool to room temperature, gases were vented and the contents of the bomb were treated with absolute methanol followed by distilled water. The reactor was then opened and polymer was extracted from the solid catalysts by the use of hot xylenes. The high molecular weight, solid polyethylenes were precipitated from solution by cooling to room temperature and separated by filtration from a filtrate of xylenes containing grease-like, lower molecular weight polyethylenes. The high molecular weight polyethylene was air-dried and then vacuum-dried at 105° C. for one hour. The polymerization reaction yielded 4.2 g. of a tough, high molecular weight, solid polymer of ethylene having a specific gravity ($d$ 24/4° C.) of 0.9557 and melt viscosity of $3.1 \times 10^6$ poises, as determined by the method of Dienes and Klemm, J. Applied Phys. 17, 458–71 (1946). In addition, there was produced 0.2 g. of grease-like polyethylenes soluble in xylenes even at room temperature.

In runs carried out without any promoters, employing the general operating procedure above described, employing the 8 weight percent prereduced molybdena-gamma-alumina catalyst, only 0.5 g. per g. of catalyst of a solid polymer of ethylene was obtained at 230° C. and 1000 p. s. i. g. initial ethylene pressure.

*Example 2*

The procedure of Example 1 was repeated using 0.46 g. of the magnesium aluminum hydride preparation and 1 g. of a catalyst prepared by partial reduction of 31 weight percent $CrO_3$ supported on activated alumina with hydrogen under the same conditions as the molybdena-alumina catalyst of Example 1. The polymerization yielded 1.65 g. of a polymer of ethylene having a specific gravity ($d$ 24/4° C.) of 0.9642 and melt viscosity of $1.55 \times 10^4$ poises, as well as 0.15 g. of grease-like polyethylenes.

*Example 3*

The procedure of Example 1 is repeated, substituting a molar equivalent of calcium aluminum hydride for the magnesium aluminum hydride. The reaction mixture is worked up as before to separate a solid polymer of ethylene.

*Example 4*

The procedure of Example 1 is repeated substituting a molar equivalent of barium aluminum hydride for the magnesium aluminum hydride. The reaction mixture is worked up as before to separate a solid polymer of ethylene.

*Example 5*

The procedure of Example 1 is repeated but propylene under a pressure between 600 and 1000 p. s. i. g. at 232° C. is substituted for ethylene. A solid polymer of propylene which is soluble in hot xylenes is extracted from the polymerization catalyst and a fraction thereof precipitates from the xylenes solution at room temperature.

The polymers produced by the process of this invention can be subjected to such after-treatment as may be desired, to fit them for particular uses or to impart desired properties. Thus, the polymers can be extruded, mechanically milled, filmed or cast, or converted to sponges or latices. Antioxidants, stabilizers, fillers, extenders, plasticizers, pigments, insecticides, fungicides, etc. can be incorporated in the polyethylenes and/or in by-product alkylates or "greases." The solid polymers can be used as films, tubes, sheets, powder, granules, etc. in the same manner as previously known solid polyethylenes.

The polymers produced by the process of the present invention, especially the polymers having high specific viscosities, can be blended with the lower molecular weight or with more highly branched polyethylenes to impart stiffness or other desired properties thereto. The solid resinous products produced by the process of the present invention can, likewise, be blended in any desired proportions with hydrocarbon oils, waxes such as paraffin or petrolatum waxes, with ester waxes, with high molecular weight polybutylenes, and with other organic materials. Small proportions between about .01 and about 1 percent of the various polymers produced by the process of the present invention can be dissolved or dispersed in hydrocarbon lubricating oils to increase V. I. and to decrease oil consumption when the compounded oils are employed in motors; larger amounts of polyethylenes may be compounded with oils of various kinds and for various purposes.

The products having a molecular weight of 50,000 or more produced by the present invention, can be employed in small proportions to substantially increase the viscosity of fluent liquid hydrocarbon oils and as gelling agents for such oils. The solution of about 1 gram of an ethylene polymer produced by this invention, having a specific viscosity $\times 10^5$ of about 50,000 in about one liter of xylenes at a temperature close to the boiling point produced an extremely viscous solution.

The polymers produced by the present process can be subjected to chemical modifying treatments, such as halogenation, halogenation followed by dehalogenation, sulfohalogenation by treatment with sulfuryl chloride, sulfonation, and other reactions to which hydrocarbons may be subjected.

This application is a continuation-in-part of our copending application for United States Letters Patent Serial No. 324,608 filed on December 6, 1952.

Having thus described our invention, what we claim is:

1. In a process for the production of a polymeric hydrocarbon material having a molecular weight of at least 300, the steps of contacting a normally gaseous olefin selected from the class consisting of ethylene, propylene and mixtures containing ethylene and propylene with a catalytic mixture prepared by admixing an alkaline earth metal aluminum hydride with an oxide of a metal of group 6a of the Mendeleef periodic table supported upon a difficultly reducible metal oxide at a reaction temperature between about 130° C. and about 325° C., and separating a polymeric hydrocarbon material having a molecular weight of at least 300 thus produced.

2. In a process for the production of a normally solid ethylene polymer, the steps of contacting ethylene with a catalytic mixture prepared by admixing an alkaline earth metal aluminum hydride with an oxide of a metal of group 6a of the Mendeleef periodic table supported upon a difficultly reducible metal oxide, effecting said contacting in the presence of a liquid hydrocarbon reaction medium at a reaction temperature between about 130° C. and about 325° C., and separating a normally solid ethylene polymer thus produced.

3. The process of claim 2 wherein said liquid hydrocarbon reaction medium is a saturated hydrocarbon.

4. The process of claim 2 wherein said liquid hydrocarbon reaction medium is a monocyclic aromatic hydrocarbon.

5. The process of claim 2 wherein said hydride is $Mg(AlH_4)_2$.

6. The process of claim 2 wherein said hydride is $Ca(AlH_4)_2$.

7. In a process for the production of a normally solid, resinous hydrocarbon material, the steps of contacting ethylene with a catalytic mixture prepared by admixing an alkaline earth metal aluminum hydride with an oxide of a metal selected from the group consisting of chromium, molybdenum and tungsten supported upon a difficultly reducible metal oxide, effecting said contacting in the presence of a liquid hydrocarbon reaction medium at a reaction temperature between about 130° C. and about 325° C. and a reaction pressure of at least about 200 p. s. i. g., and separating a normally solid, resinous hydrocarbon material thus produced.

8. In a process for the production of a normally solid, resinous hydrocarbon material, the steps which comprise contacting ethylene in a concentration between about 2 weight percent and about 10 weight percent in a liquid hydrocarbon reaction medium with a catalytic mixture prepared by admixing an alkaline earth metal aluminum hydride with a catalyst comprising essentially a minor proportion of an oxide of a metal selected from the group consisting of chromium, molybdenum and tungsten supported upon a major proportion of a difficultly reducible metal oxide, the ratio of alkaline earth metal aluminum hydride to metal oxide catalyst being between about 0.005 and about 2 by weight, at a temperature between about 130° C. and 325° C. and a pressure between about 200 and about 5000 p. s. i. g., and separating a normally solid, resinous hydrocarbon material thus produced.

9. The process of claim 8 wherein the hydride is magnesium aluminum hydride, the liquid reaction medium is an aromatic hydrocarbon and the metal oxide is molybdenum oxide supported on alumina.

No references cited.